United States Patent
Brumley et al.

(10) Patent No.: US 8,078,865 B2
(45) Date of Patent: Dec. 13, 2011

(54) SYSTEMS AND METHODS FOR CONFIGURING OUT-OF-BAND BIOS SETTINGS

(75) Inventors: Alan J. Brumley, Cedar Park, TX (US); Samer El-Haj-Mahmoud, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1006 days.

(21) Appl. No.: 11/943,110

(22) Filed: Nov. 20, 2007

(65) Prior Publication Data

US 2009/0132799 A1 May 21, 2009

(51) Int. Cl.
*G06F 15/177* (2006.01)
(52) U.S. Cl. .................. 713/100; 713/1; 713/2
(58) Field of Classification Search .......... 713/100, 713/1, 2
See application file for complete search history.

(56) References Cited

U.S. PATENT DOCUMENTS

| | | | |
|---|---|---|---|
| 6,904,482 B2 | 6/2005 | Rietze et al. | 710/107 |
| 7,293,165 B1 * | 11/2007 | Tobias | 713/1 |
| 7,484,084 B1 * | 1/2009 | Ranaweera et al. | 713/1 |
| 2003/0028766 A1 * | 2/2003 | Gass et al. | 713/164 |
| 2004/0024917 A1 * | 2/2004 | Kennedy et al. | 710/1 |
| 2007/0150715 A1 * | 6/2007 | Rothman et al. | 713/1 |
| 2009/0006834 A1 * | 1/2009 | Rothman et al. | 713/2 |
| 2010/0088499 A1 * | 4/2010 | Zimmer et al. | 713/2 |

* cited by examiner

*Primary Examiner* — Vincent Tran
(74) *Attorney, Agent, or Firm* — Baker Botts L.L.P.

(57) ABSTRACT

A method may for updating system configuration data is provided. A configuration change request may be received from a remote user at a local baseboard management controller (BMC) via a network while a processor associated with the BMC is offline. The configuration change request may be stored in a request log. After the processor comes online, the configuration data may be updated based on the configuration change request stored in the request log. A copy of the updated configuration data from the chipset may be stored in a storage device coupled to the BMC such that the copy of the updated configuration data is accessible when the processor is offline. The copy of the updated system configuration may be provided to a subsequent remote user for a subsequent system configuration update.

19 Claims, 3 Drawing Sheets

SYSTEMS AND METHODS FOR CONFIGURING OUT-OF-BAND BIOS SETTINGS

TECHNICAL FIELD

The present disclosure relates in general to BIOS configuration, and more particularly to a system and method of configuring out of band BIOS settings.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some information handling systems, a basic integrated system (BIOS) may be used to ensure that all components are functional. Particularly, the BIOS may be responsible for establishing the association between device components (e.g., disk drives, video controllers, keyboard, mouse, etc.) and the operating system executed by the information handling system. The BIOS may also include data and instructions that enable the operating system to access the information handling system hardware. The system BIOS is stored in the information handling system's memory, typically in non-volatile memory such as flash memory, for example. During booting, the system BIOS first performs a Power On Self Test (POST), and then proceeds to load the operating system. Following successful loading of the operating system, the user will be able to take advantage of all features and functionality offered by or through the operating system.

In many occasions it is desirable to update the system BIOS. For example, the system BIOS may be updated to take advantage of new BIOS features that become available, or to enable the BIOS to support new system hardware. Updating the BIOS may also be necessary if problems with the system BIOS are detected.

Current techniques for remotely configuring BIOS settings include interactively using the BIOS Setup with console redirection or with a remote access controller. Alternatively, the information handling system may boot the operating system to a server that may allow BIOS configuration.

However, current techniques require that the information handling system processor be powered on and running a specific operating system or pre-operating system environment to be able to configure the BIOS setting. For configurations such as a multi-system cluster, powering all of the systems is typically time consuming and power consuming.

SUMMARY

In accordance with an embodiment of the present disclosure, a method may for updating system configuration data is provided. A configuration change request may be received from a remote user at a local baseboard management controller (BMC) via a network while a processor associated with the BMC is offline. The configuration change request may be stored in a request log. After the processor comes online, the configuration data may be updated based on the configuration change request stored in the request log. A copy of the updated configuration data from the chipset may be stored in a storage device coupled to the BMC such that the copy of the updated configuration data is accessible when the processor is offline. The copy of the updated system configuration may be provided to a subsequent remote user for a subsequent system configuration update.

In accordance with another embodiment of the present disclosure, an information handling system including a processor and a baseboard management controller (BMC) is provided. The BMC may be configured to receive a configuration change request from a remote user via a network while the processor is offline; store the configuration change request in a request log; update configuration data based on the configuration change request stored in the request log after the processor comes online; store a copy of the updated configuration data in a storage device coupled to the BMC such that the copy of the updated configuration data is accessible when the processor is offline; and access and provide the copy of the updated system configuration to a subsequent remote user when the processor is offline.

In accordance with a further embodiment of the present disclosure, an apparatus including a baseboard management controller (BMC) is provided. The BMC may be configured to receive a configuration change request from a remote user via a network while the processor is offline; store the configuration change request in a request log; update configuration data based on the configuration change request stored in the request log after the processor comes online; store a copy of the updated configuration data in a storage device coupled to the BMC such that the copy of the updated configuration data is accessible when the processor is offline; and access and provide the copy of the updated system configuration to a subsequent remote user when the processor is offline.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
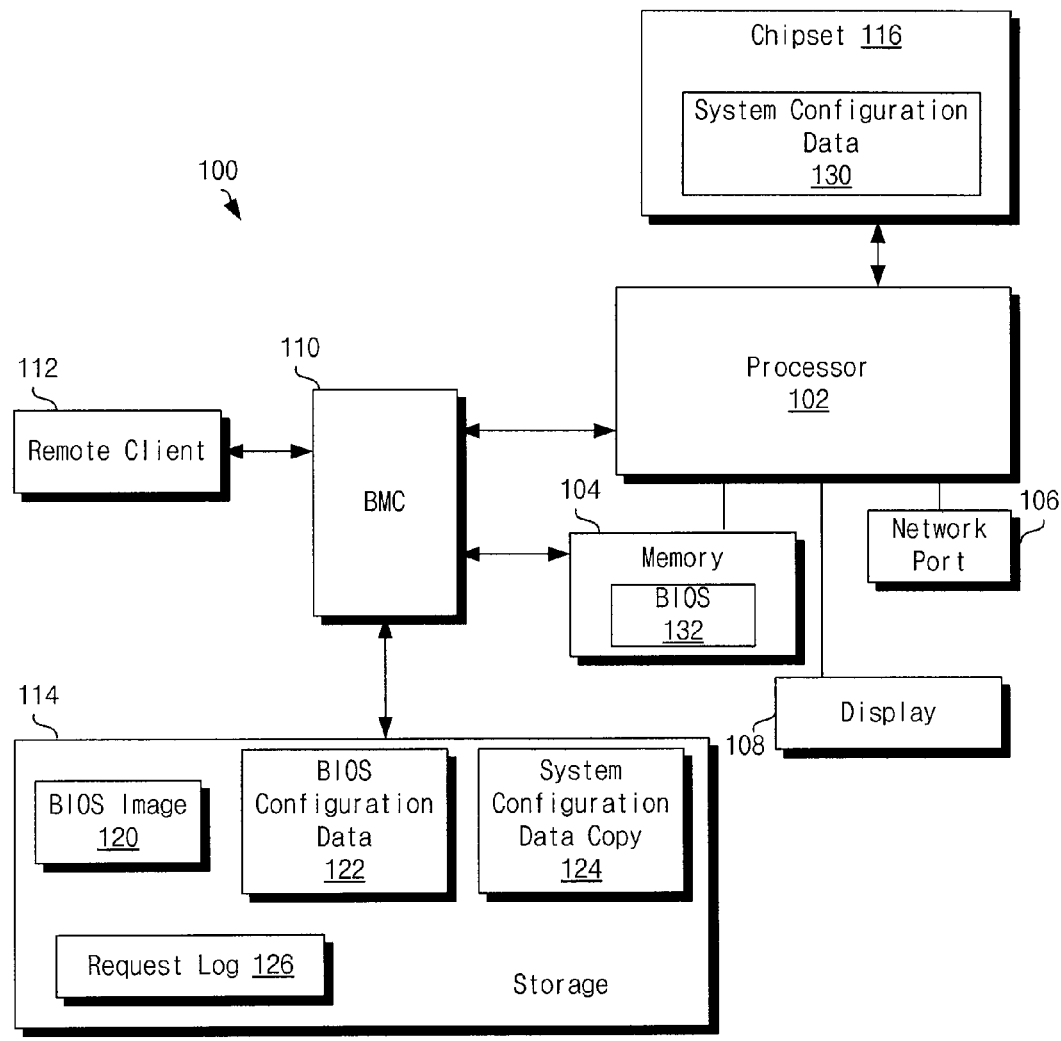
FIG. 1 illustrates an example information handling system having a system for remotely updating a system configuration, in accordance with embodiments of the present disclosure.
Figure 2:
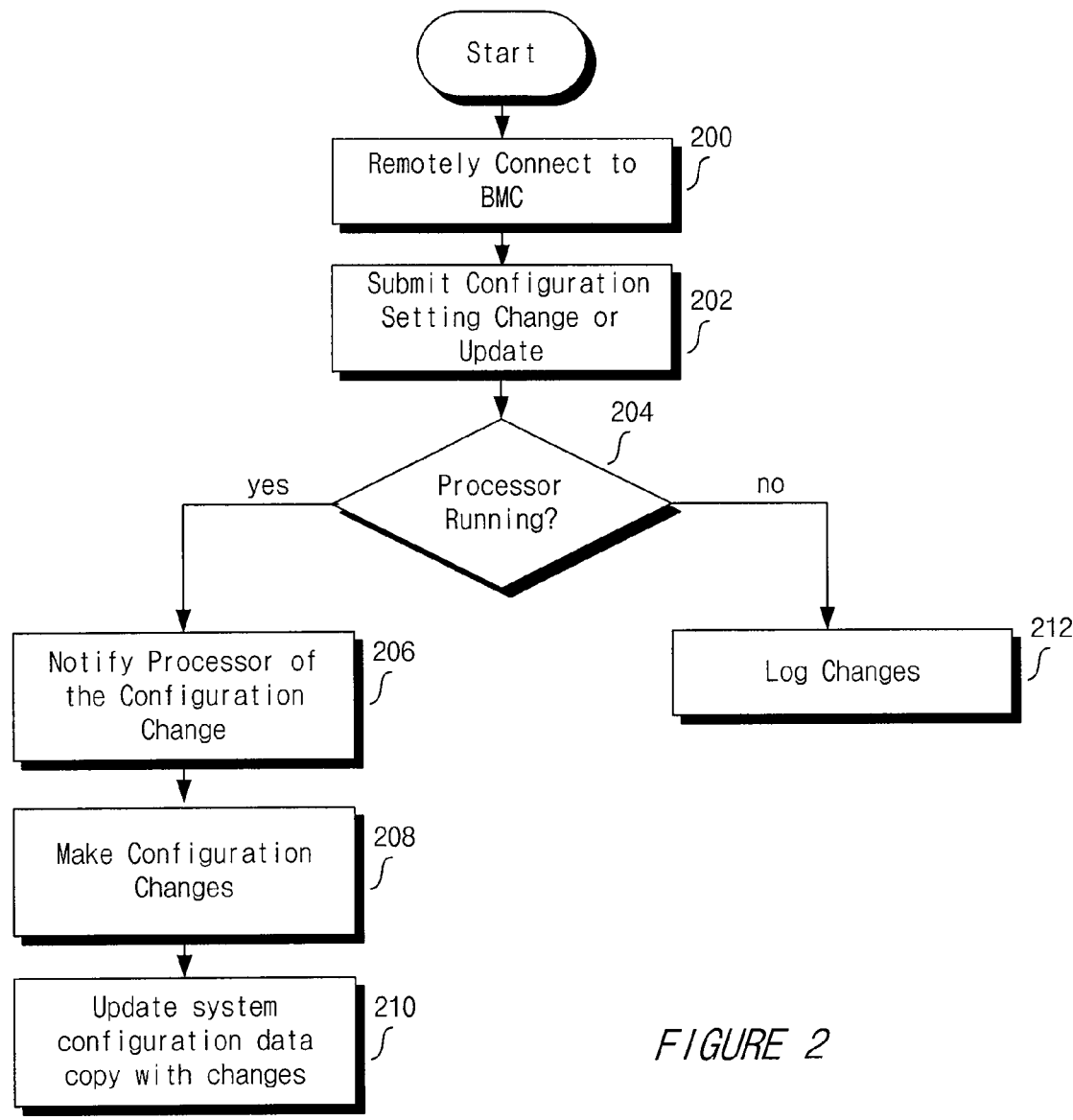
FIG. 2 illustrates a flowchart for remotely updating a system configuration, in accordance with embodiments of the present disclosure.
Figure 3:
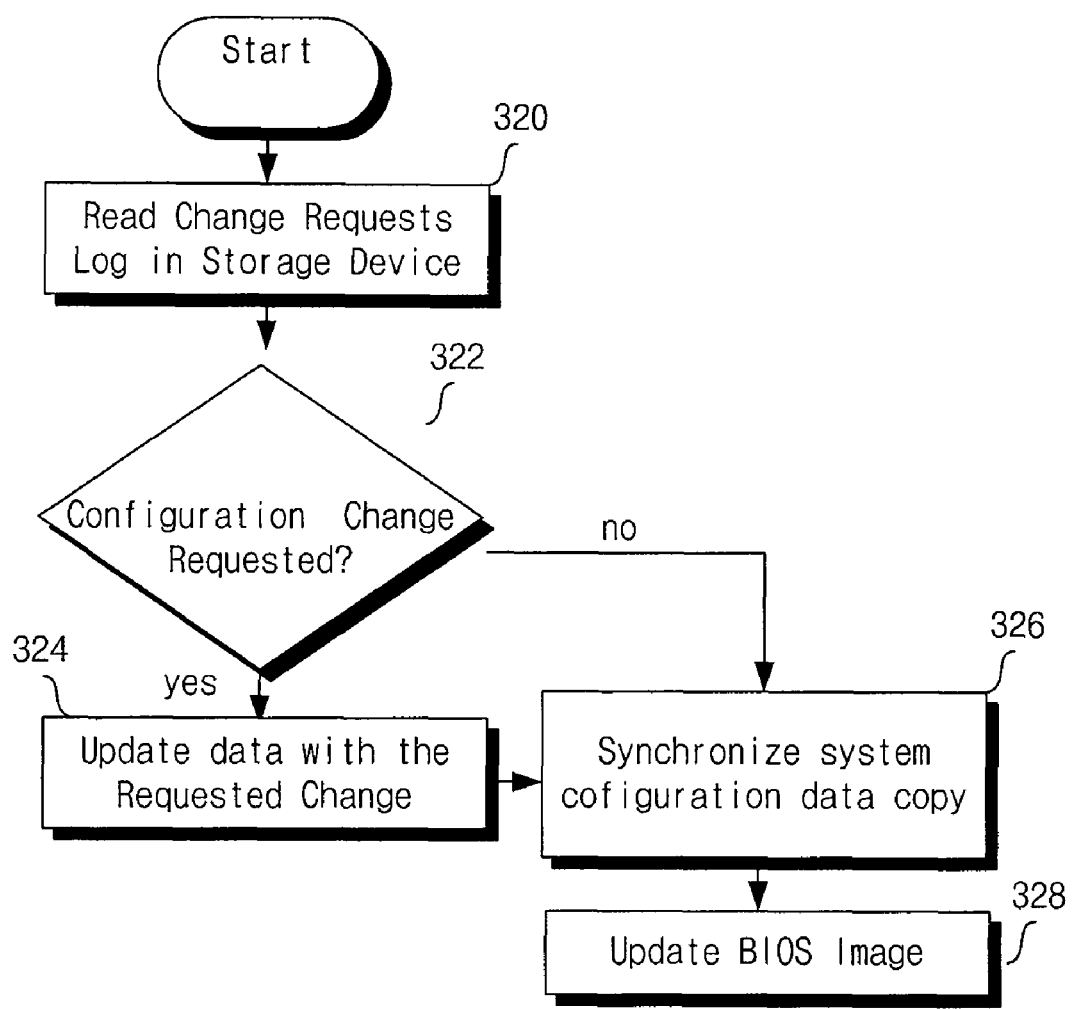
FIG. 3 illustrates a flowchart of a method for updating system configuration data, in accordance with embodiments of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

FIG. 1 illustrates an example information handling system 100 having a system for remotely updating a system configuration, in accordance with embodiments of the present disclosure. As shown in FIG. 1, information handling system 100 may include a processor 102, memory 104, a network port 106, a display 108, a baseboard management controller (BMC) 110, a remote client 112, storage 114, and a chipset 116.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100 and may output results, graphical user interfaces (GUIs), websites, and the like via display 108 or over network port 106.

Memory 104 may be coupled to processor 102 and may comprise any system, device, or apparatus operable to retain program instructions or data for a period of time. Memory 104 may be random access memory (RAM), electrically erasable programmable read-only memory (EEPROM), a PCM-CIA card, flash memory, or any suitable selection and/or array of volatile or non-volatile memory that retains data after power to information handling system 100 is turned off. For example, memory 104 may store a basic integrated operating system (BIOS) 132, generally referred to as a basic input/output system, which may include a firmware configured to identify and/or initiate hardware components (e.g., hard drives, floppy drive, disk drives, keyboards, mouse, and other integrated or peripheral components coupled to information handling system 100).

Display 108 may comprise any display device suitable for creating graphic images and/or alphanumeric characters recognizable to a user, and may include, for example, a liquid crystal display (LCD) or a cathode ray tube (CRT).

Network port 106 may be any suitable system, apparatus, or device operable to serve as an interface between information handling system 100 and a network. Network port 106 may enable information handling system 100 to communicate over a network using any suitable transmission protocol and/or standard, including without limitation all transmission protocols and/or standards known in the art.

Remote client 112 may be coupled to BMC 110 and may be any suitable system, apparatus, or device operable to connect to BMC 110 via, a network port for remote BIOS configuration and/or updates. In some instances, remote client 112 may be coupled to network port 106 and may be configured to connect with BMC 110 for remote BIOS configuration and/or updates. Remote client 112 may be a web-client processor that interfaces with BMC 110 via a wired or wireless network. Remote client 112 may also be an information handling system operable to execute a scriptable interface such as RACADM or a server management command line protocol (SMCLP). Details of an example interface provided via a remote client (e.g., out of band interface) are described in U.S. Ser. No. 11/683,196 entitled "Information Handling System Employing Unified Management Bus," which is incorporated herein by reference in its entirety.

Chipset 116 coupled to processor 102 may include any system, device, or apparatus operable to retain data or instructions for a period of time. In alternative embodiments, chipset 116 may be located within processor 102 and may be configured to store system configuration data.

Chipset 116 may include system configuration data 130. System configuration data 130 may include, e.g., a complimentary metal oxide semiconductor (CMOS) data stored in a read-accessible memory (RAM), and may include system data used during a boot-up sequence, e.g., disk drive (e.g., floppy and/or hard disk drives) values, keyboard values, processor 102 set values, cache set up values, RAM type value, date and time, and other system configurations.

Storage 114 may be coupled to BMC 110 and may comprise any system, device, or apparatus operable to retain program instructions or data for a period of time. In one embodiment, storage 114 may be a large persistent device or a storage device that does not lose the stored content when power to the device is removed or interrupted. For example, storage 114 may be a FLASH memory, an erasable electrically programmable read only memory (EEPROM), or other suitable memory known in the art.

Storage 114 may store a BIOS image 120, BIOS configuration data 122, a system configuration data copy 124, and a request log 126. BIOS image 120 may be a program code that may define the BIOS. Further, BIOS image 120 may also include configuration data that may be needed during a BIOS update.

BIOS configuration data 122 may be associated with BIOS image 120 and may include, e.g., non-volatile random access memory data. In some embodiments, write operations for BIOS configuration data 122 may be disabled such that BIOS configuration data 122 may be configured as a read only section. This may provide a safe configuration, especially in situations where BIOS image data 120 is updated and the BIOS configuration data may be altered during this update. BIOS configuration data 122 may be provided to a user when a change or update request is received at BMC 110.

System configuration data copy 124 coupled to BIOS image 120 may be a substantially similar or an identical copy of the system configuration data 130 stored in chipset 116. In one embodiment, system configuration data copy 124 may store the exact system configuration-related data values as system configuration data 130 stored in chipset 116 including, e.g., disk drive (e.g., floppy and hard disk drives) values, keyboard values, CPU set values, cache set up values, RAM type value, date and time, and/or other system configuration data. Like BIOS configuration data 122, system configuration data copy 124 may be provided to a user when a change or update request is received at BMC 110, as discussed below.

Request log 126 coupled to the system configuration data copy 124 may be a log of change and/or update requests entered by BMC 110. For example, BMC 110 may record configuration data change and/or update requests received from remote client 112 (e.g., system configuration data or BIOS configuration data) in request log 126 when processor 102 is offline (e.g., not powered on). In some embodiments, BMC 110 may also record scheduled maintenance or scheduled updates to system configuration, BIOS image, or BIOS configuration in request log 126.

BMC 110 may be coupled to processor 102 and may be used as a firmware hub (FWHUB) in communication with chipset 116 and/or BIOS 132 stored in memory 104. BMC 110 may receive configuration updates and/or change requests from remote client 112 and communicate the updates or requests to BIOS 132, processor 102, and/or request log 126. For example, if BMC 110 receives a change or update request from remote client 122 when processor 102 is offline, BMC 110 may forward the change or update request to request log 126.

When processor 102 comes online, BIOS 132 may read request log 126 stored in storage 114 and update system configuration data 130 stored in chipset 116 based on any relevant change requests or updates stored in request log 126. The updated system configuration data 130 may subsequently be copied to system configuration data copy 124 in storage 114, as discussed below.

Storing system configuration data copy 124 in storage 114 may allow a user to remotely provide updates or change requests to the BIOS configuration via BMC 110 while processor 102 is offline (e.g., not powered on). In particular, when a user connects to BMC 110 via remote client 112, BMC 110 may provide system configuration data copy 124 to the user without having to access system configuration data 130 and thus without having to boot up or power processor 102.

FIG. 2 illustrates a flowchart for updating a BIOS configuration remotely, in accordance with embodiments of the present disclosure. At step 200, a user may connect to BMC 110 via remote client 112. The user may connect via the Internet on a wired or wireless connection coupled to BMC 110. Alternatively, remote client 112 may provide a scriptable user interface to the user, where the user may remotely update the BIOS configuration.

When the user connects to BMC 110, BMC 110 may retrieve BIOS and/or system configuration data and provide such data to the user at remote client 112. For example, BMC 110 may read BIOS configuration data 122 from storage 114 and provide such data to the remote user. In addition, if processor 102 is online (e.g., powered on), BMC 110 may retrieve system configuration data 130 from chipset 116 and provide such data to the remote user. Alternatively, if processor 102 is offline (e.g., not powered on), BMC 110 may retrieve system configuration data copy 124 from storage 114 and provide such data to the remote user. Because system configuration data copy 124 is an updated copy of system configuration data 130, and stored in storage 114, BMC 110 need not access system configuration data 130 in chipset 116 in order to provide the current system configuration data to the user. Thus, BMC 110 may provide the current system configuration data (i.e., system configuration data copy 124) to the user even when processor 102 is offline.

At step 202, the user may access the BIOS and/or system configuration data provided by BMC 110, and submit a configuration update or change request to BMC 110, e.g., to change or update BIOS configuration data 122 and/or system configuration data 130.

At step 204, if processor 102 is online, BMC 110 may notify BIOS 132 at step 206 that a configuration change or update has been requested. At step 208, BIOS 132 may apply the requested configuration changes and/or updates to system configuration data 130 stored in chipset 116 and/or BIOS configuration data 122 in storage 114.

At step 210, if the configuration change or update request includes an update or change to system configuration data 130, BIOS 132 may also update system configuration data copy 124 via BMC 110 such that system configuration data copy 124 is substantially the same or identical to system configuration data 130 stored in chipset 116.

However, if processor 102 is not online at step 204, BMC 110 may log the change request or update from the remote user in request log 126 at step 212. At the next operating system bootup, the changes may be provided to chipset 116, for example, as discussed below regarding FIG. 3.

FIG. 3 illustrates a flowchart of a method for updating configuration data for an information handling system, in accordance with embodiments of the present disclosure. The method allows a change request or update received from a user at remote client 112 to be received (and logged in request log 126 for later processing) when processor 102 is offline. Upon powering processor 102, the change request or update may be processed and BIOS configuration data 122 and/or system configuration data 130 may be updated accordingly. This may be particularly advantageous for information handling systems 100 that have more than one processor 102 as change requests or updates may be received when processors 102 are offline and stored for processing until each processor 102 is brought online (e.g., powered on).

At step 320, BIOS 132 may read a change or update request from request log 126 in storage 114. The change and/or update request may include a scheduled system change and/or a change or update request received from a user via remote client 112 and stored in request log 126 (e.g., at step 212 of the method of FIG. 2).

At step 322, BIOS 132 may determine if the change request or update requires a system configuration data change and/or a BIOS configuration change. If BIOS 132 determines the change request includes changes and/or updates to system configuration data 130, BIOS 132 may forward the change request to chipset 116 at step 324 such that the changes may be stored made to system configuration data 130.

At step 326, a copy of the updated system configuration data 130 may be provided to BMC 110 from chipset 116. BMC 110 may synchronize the system configuration data 130 by writing a copy of the data from chipset 116 to system configuration data copy 124 in storage 114. At step 328, BMC 110 may update BIOS image 120 to incorporate changes made to system configuration data 130.

Similarly, if BIOS 132 determines at step 322 that the changes include a change to BIOS configuration data 122 (e.g., change to the BIOS configuration data), BIOS 132 may provide the requested change and/or update to BIOS configuration data 122 at step 324. Steps 326 and 328 may be optional in such instance.

Although the present disclosure has been described in detail, it should be understood that various changes, substitutions, and alterations can be made hereto without departing from the spirit and the scope of the invention as defined by the appended claims.

What is claimed is:

1. A method comprising:
receiving a configuration change request from a remote user at a local baseboard management controller (BMC) via a network while a processor associated with the BMC is offline;
storing the configuration change request in a request log;
after the processor comes online, updating configuration data based on the configuration change request stored in the request log;
storing a copy of the updated configuration data in a storage device coupled to the BMC such that the copy of the updated configuration data is accessible when the processor is offline; and
providing the copy of the updated system configuration to a subsequent remote user for a subsequent system configuration update.

2. The method of claim 1, wherein receiving a configuration change request comprises receiving a configuration change request from a user connecting remotely via a remote client.

3. The method of claim 1, wherein receiving a configuration change request comprises receiving system configuration data changes.

4. The method of claim 1, wherein updating the configuration data comprises storing the configuration changes to a chipset not accessible when the processor is offline.

5. The method of claim 1, wherein updating the configuration data comprises updating complimentary metal oxide semiconductor (CMOS) read-accessible memory (RAM) data.

6. The method of claim 1, wherein receiving a configuration change request comprises receiving BIOS configuration data changes.

7. The method of claim 6, further updating non-volatile random access memory (NVRAM) with the BIOS configuration data change.

8. The method of claim 1, wherein the processor being offline comprises the processor being powered down.

9. An information handling system comprising:
a processor; and
a baseboard management controller (BMC) associated with the processor, the BMC configured to:
receive a configuration change request from a remote user via a network while the processor is offline;
store the configuration change request in a request log;
after the processor comes online, update configuration data based on the configuration change request stored in the request log;
store a copy of the updated configuration data in a storage device coupled to the BMC such that the copy of the updated configuration data is accessible when the processor is offline; and
access and provide the copy of the updated system configuration to a subsequent remote user when the processor is offline.

10. The information handling system of claim 9 further comprising a chipset coupled to the processor, the chipset storing the updated system configuration.

11. The information handling system of claim 9, further comprising more than one processor in a network configuration.

12. The information handling system of claim 11, wherein updating the system configuration data comprises updating the system configuration data in more than one processor.

13. The information handling system of claim 9, wherein the BMC is configured to:
receive a request to update BIOS settings data stored in non-volatile random access memory (NVRAM) data associated with the BMC;
update the BIOS settings data stored in NVRAM based on the received request.

14. The information handling system of claim 9, wherein the configuration change request includes a request to update system configuration data.

15. The information handling system of claim 9, wherein updating the configuration data comprises storing the configuration changes to a chipset not accessible when the processor is offline.

16. An apparatus comprising:
a baseboard management controller (BMC) configured to:
receive a configuration change request from a remote user via a network while the processor is offline;
store the configuration change request in a request log;
after the processor comes online, update configuration data based on the configuration change request stored in the request log;
store a copy of the updated configuration data in a storage device coupled to the BMC such that the copy of the updated configuration data is accessible when the processor is offline; and
provide the copy of the updated system configuration to a subsequent remote user when the processor is offline.

17. The apparatus of claim 16, wherein updating the system configuration data comprises updating complimentary metal oxide semiconductor (CMOS) read-accessible memory (RAM) data with the system configuration change.

18. The apparatus of claim 16, wherein the BMC is further configured to receive a BIOS settings change request and update BIOS settings data based on the received request.

19. The apparatus of claim 16, wherein updating the configuration data comprises storing the configuration changes to a chipset not accessible when the processor is offline.

* * * * *